Feb. 22, 1966         H. A. STEINBERG         3,236,227
            AUXILIARY HEATING MEANS FOR SOLAR OVEN
Filed Feb. 3, 1964                              2 Sheets-Sheet 1
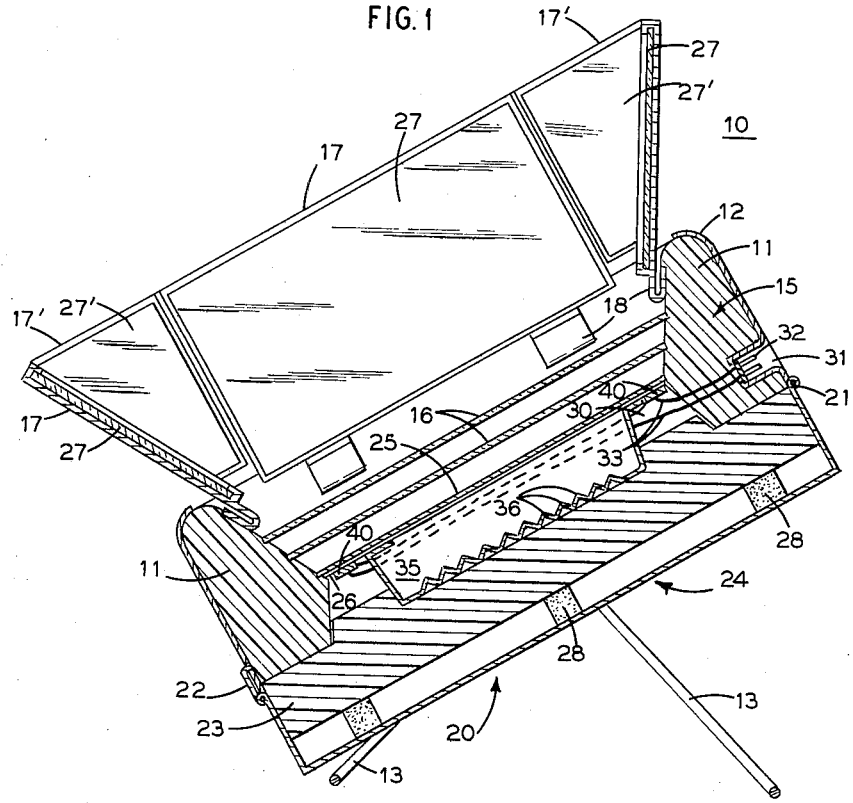
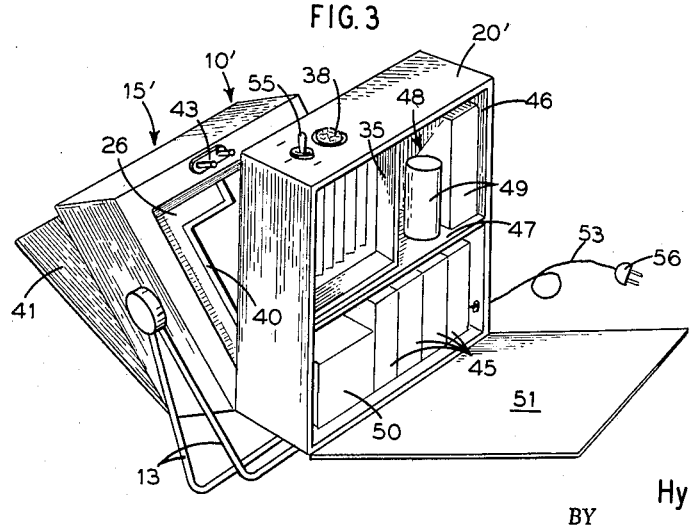
INVENTOR.
Hyman A. Steinberg
BY
ATTORNEY Feb. 22, 1966     H. A. STEINBERG     3,236,227
AUXILIARY HEATING MEANS FOR SOLAR OVEN
Filed Feb. 3. 1964     2 Sheets-Sheet 2
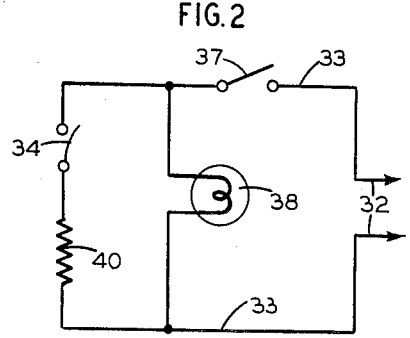
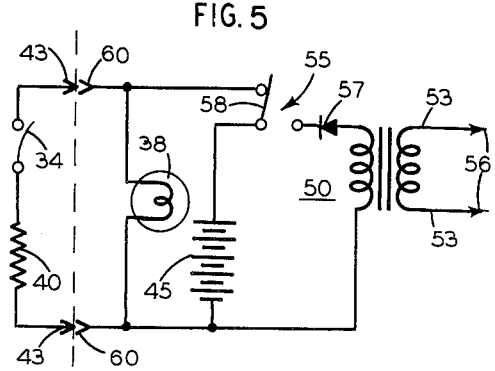
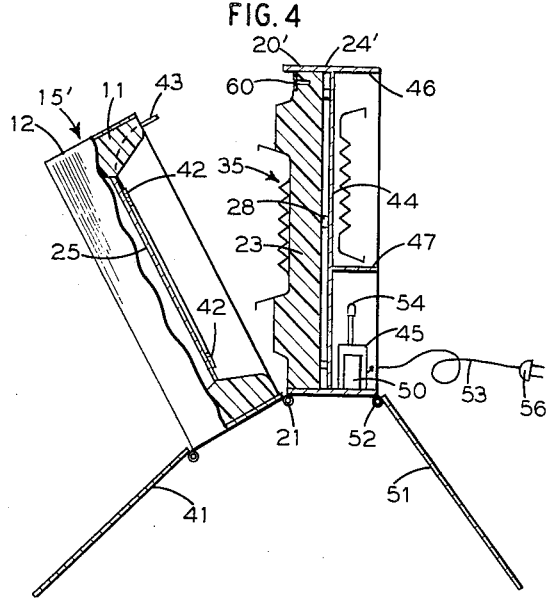
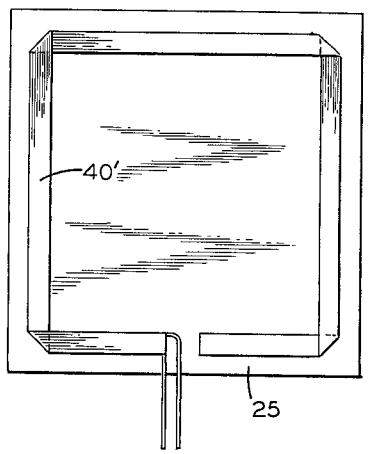
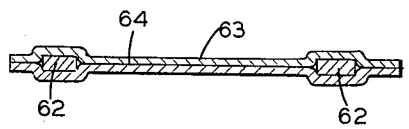
INVENTOR.
Hyman A. Steinberg
BY
ATTORNEY United States Patent Office 3,236,227
Patented Feb. 22, 1966

3,236,227
AUXILIARY HEATING MEANS FOR SOLAR OVEN
Hyman A. Steinberg, 7—25 166th St.,
Whitestone 57, N.Y.
Filed Feb. 3, 1964, Ser. No. 341,991
9 Claims. (Cl. 126—270)

This invention relates to solar ovens and, more particularly, to a solar oven provided with an auxiliary heating means whereby the oven may be used for heating and cooking in the absence of solar energy.

Solar ovens essentially include a body formed with an insulated heating compartment and a means for concentrating solar energy into the insulated heating compartment to elevate the temperature thereof. In order to make the best available use of the solar energy, the heating compartment is very effectively insulated so that heat losses therefrom are kept to an absolute minimum. Thus, the heating compartment may be said to comprise a very efficient oven.

However, solar ovens as hitherto constructed are useful only where there is available substantial solar energy, as in the presence of bright or strong sunlight, for example, although the solar oven may be used with somewhat less efficiency with relatively weak sunlight. In any event, a solar oven is essentially a device for use only outdoors and only in the presence of sunlight.

This factor, which is inherent in solar ovens as hitherto constructed, has greatly reduced the use or availability factor of these ovens, and the use factor is even further reduced in areas where sunlight is at a minimum. Nevertheless, and due to the highly efficient heating compartment of solar ovens, it would be highly desirable that such solar ovens could be used indoors or when there is no sunlight.

It may further happen that the user of a solar oven may take the same to a picnic spot in anticipation of sunlight and then find, when he arrives at the picnic area, that the sunlight has either disappeared or has been reduced to a value insufficient for effective use of the solar oven. Consequently, if any picnic food is to be cooked, it must be cooked over an open fire or a fuel heated grill.

An object of the present invention is to provide an improvement in solar ovens whereby the latter are not limited to use solely where there is available sunlight.

Another object of the invention is to provide a solar oven with auxiliary electric heating means for the heating compartment.

Still another object of the invention is to provide a solar oven with auxiliary electric heating means which may be energized from a rechargeable battery.

Yet another object of the invention is to provide a solar oven with a hinged door forming one wall of the heating compartment, with this door having a compartment to receive a rechargeable battery and/or a storage compartment for food trays and other picnic items.

These and other objects, advantages and novel features of the invention will be apparent from the following description of typical embodiments thereof as illustrated in the accompanying drawings. In the drawings:

FIG. 1 is a transverse sectional view through one form of solar oven incorporating the improvement in accordance with the present invention;

FIG. 2 is a schematic wiring diagram of the electric circuit of the solar oven shown in FIG. 1;

FIG. 3 is a perspective view of another form of solar oven embodying the invention, the view illustrating the oven with the door and covers open;

FIG. 4 is a transverse sectional view of the oven shown in FIG. 3;

FIG. 5 is a schematic wiring diagram of the electric circuitry of the oven shown in FIGS. 3 and 4;

FIG. 6 is a bottom plan view of the grill illustrating a preferred form of heating element thereon; and FIG. 7 is an enlarged and exaggerated cross section of such heating element.

Referring particularly to FIG. 1, a typical, commercially available solar oven, shown by way of example only, is indicated at 10 as including a body 15 and a door 20. Oven 10 is generally rectangular in plan, and body 15 comprises four side walls 11 of heat insulation material extending between the outer and inner end surfaces of the body. These outer and inner end surfaces lie in substantially parallel planes perpendicular to the exterior surfaces of walls 11. The inner surfaces of sidewalls 11 of body 15 extend at an angle to the outer surfaces thereof so as to define an inwardly converging opening through body 15. In the particular oven selected by way of example, the inner surfaces of sidewalls 11 extend at an angle of substantially 60° with respect to the parallel end surfaces of body 15. The outer surfaces of the heat insulating walls 11 of body 15 are enclosed within a plastic, metal, or wood casing generally indicated at 12. Support legs 13 may be associated with the oven, so as to maintain the same at a predetermined angle to the horizontal.

Door 20 is hinged to body 15 by hinge means indicated at 21, and may be retained in closed position by releasable latch means indicated at 22. Door 20 includes a body of heat insulation material 23 enclosed within a pan-shape plastic, metal, or wood casing 24. Hinge means 21 and latch means 22 are on casings 12 and 24. Door 20 is arranged to close the inner end of body 15 and, in the closed position, to have the inner plane surface of the heat insulation body 23 in substantial surface-to-surface contact with the inner plane end surface of body 15.

At a short distance inwardly from the outer end surface of body 15, a pair of substantially parallel transparent plates 16 are mounted on ledges in the inner surfaces of walls 11, plates 16 preferably being in parallel relation with each other and in sealing relation with the inner surfaces of walls 11 so as to define a substantially dead airspace therebetween. Inwardly of the innermost plate 16 there is a substantially flat grill 25 of heat absorbing and heat conductive material, such as a suitable metal which may be blackened or otherwise treated so as to increase its solar energy absorption. The inner surface of grill 25 may be coated with a suitable plastic material 26 such as a fluorocarbon or silicone resin, to which food particles will not adhere and which is heat resistant. Grill 25 is also supported in ledges in the inner surfaces of sidewalls 11 and is preferably in sealing relation with such inner surfaces so as to define a dead airspace between the innermost plate 16 and the grill 25.

Grill 25 is spaced outwardly from the major portion of the inner surface of door 20, and the grill, conjointly with such inner surface of the door 20 and the portions of sidewalls 11 inwardly of grill 25, defines a heating compartment 30. Heating compartment 30 is arranged to receive a food pan or food chamber 35. In the embodiment illustrated, food chamber 35 is substantially rectangular in plan and somewhat smaller in area than grill 25. Food chamber or pan 35 has a bottom wall arranged to rest on the inner surface of body 23 of cover 20, a pair of substantially parallel sidewalls, and a pair of end walls.

Pan or food chamber 35 may be formed in any suitable manner, from suitable materials such as, for example, aluminum foil, and the bottom wall of the pan may be formed with ribs 36 extending substantially parallel to the end walls of the pan. The upper edges of the end walls are formed with flat flanges, one directed inwardly and the other directed outwardly, and these flanges are arranged to lie in substantially planar contact with the coating 26 of grill 25. To retain pan or food chamber 35 in a position, the inner surface of heat insulation body 23 of door 20 may be formed with suitable retaining means, illustrated in FIG. 1 as a substantially trapezoidal rib shaped to conform to the lower edges of the side and end walls of pan 35 and to extend therearound. The spacing of the inner surface of body 23 of door 20 from grill 25, in the closed position of door 20, is such that the flanges on the end walls of pan 35 and the upper edges of the sidewalls thereof are maintained in heat conducting contact with the inner surface coating 26 of grill 25.

The open outer end of body 15 may be closed by a plurality of walls 17 each hinged at its inner edge to the inner surfaces of walls 11 of body 15, as indicated at 18. In its open position, each wall 17 extends substantially parallel to the inner surface of its associated wall 11. The walls 17 may be made of any suitable rigid material, such as a plastic composition material, for example, and each wall has a mirror 27 on its inner surface. In order to form a completely mirrored, light entry tunnel for the solar oven in its operative position, each hinged wall 17 has a trapezoidal corner wall 17' hinged thereto, and each corner wall 17' has a mirror 27' on its inner surface.

The mirrored walls 17 and 17' are arranged to be folded, in substantially flat overlapping relation, to close the open outer end of body 15, and a suitable cover (not shown) may be hinged to the outer end of body 15 to completely enclose the folded walls 17 and 17'. When the solar oven is to be used, walls 17 and 17' are unfolded so that each of the walls extends at an angle of substantially 60° to the plane of grill 25, suitable means being provided to maintain the walls in the erected position.

In operation, solar oven 10 is tilted in the direction of the sun, for example, to the position shown in FIG. 1. The sun's rays pass through transparent plates 16 and impinge upon metal grill plate 25 which absorbs the solar energy. Light entering into oven 10 is reflected by mirrors 27 and 27' in such a manner that all of the solar energy is concentrated upon grill 25 so as to heat the heating compartment 30 containing food chamber or pan 35.

When door 20 is swung open and food pan 35 is placed in position thereon, food may be placed in the pan and the door may be closed so that the rim of the pan will contact the inner coated surface of grill 25. In order to assure a good sealing contact between body 15 and the insulating body 23 of door 20, body 23 may be mounted to float in the pan shape casing 24, as by being mounted upon strips 28 of resilient material disposed on the inner surface of the outer end wall of casing 24. These strips 28 may be strips or pieces of plastic or rubber foam material. When door 20 is closed, the resiliency of the strips 28 and the floating mounting of body 23 in casing 24 assure a good tight seal between the inner surface of body 23 and the inner end surfaces of walls 11 of body 15.

In accordance with the invention, electric heating means are provided within the heating compartment 30 of oven 10. This electric heating means comprising a heating element 40 which is mounted against the coated surface 26 of grill 25 around the outer periphery of chamber 35. Element 40 may be in the form of an elongated strip of high electrical resistance material which is held in contact with surface 26 by a suitable heat resistant adhesive tape or the like. However, a preferred form of heating element is that shown in FIGS. 6 and 7 and which is a tape comprising a pair of laterally spaced copper conductors sealed between superposed strips of impregnated asbestos with a conductive layer of graphite extending between the conductors. This element is described more fully hereinafter.

An outwardly opening recess 31 is formed in one side wall of casing 12 and extending into the corresponding sidewall 11 of body 15, and a recessed type of male connectors 32 is mounted in recess 31. A pair of leads or insulated conductors 33 connect the prongs of male connector 32 to electric resistance heating element 40. Thereby, oven 10 may be connected to a source of suitable power by means of a utility cord of the type having a male cord plug on one end for engagement in a convenience outlet and a female connector on the opposite end which will mate with male connector 32. For example, the type of utility cord usually used to connect irons, grills, cooking vessels, and the like, to a convenience outlet may be readily used with solar oven 10.

Referring to FIG. 2, heating element 40 is connected to conductors 33 in series with a suitable thermostat 34 set to open, for example, at a maximum temperature of 400° F. A single pole, single throw switch 37 is provided in one conductor 33 to control connection of element 40 to male connector 32, and a suitable pilot lamp 38 may be connected in parallel with the series combination of heating element 40 and thermostat 34. Pilot lamp 38 will thus indicate when switch 37 is closed.

With the provision of electric heating element 40 in heat conductive relation with grill 25, and the provision of leads 33 and male connector 32, oven 10 may be readily connected to a convenience outlet for indoor use or even to an outdoor convenience outlet for outdoor use. However, the arrangement shown in FIGS. 1 and 2 has a disadvantage that it can be used only where there is a supply of commercial current available, with the use of the oven 10 thus being limited to places which are accessible to power lines.

The arrangement shown in FIGS. 3, 4 and 5 obviates this limitation upon the use of solar oven 10. Referring to these figures, the solar oven 10' illustrated therein, insofar as its solar heating function is concerned, is substantially identical with oven 10. Except for the location of a male connector, body 15' is identical with body 15 and hence will not be described in detail. The aforementioned closure cover for the outer end of body 15', which may be closed after the mirrored walls are folded in overlapping relation, is indicated at 41 as hinged to casing 12 of body 15'. Heating element 40, of which a preferred form is described more fully hereinafter, is again engaged with the coated surface of grill 25, and may be held thereagainst by a suitable heat resistant adhesive tape 42. The opposite ends of heating element 40 are connected to the opposite terminals of a male conductor 43 which, in the arrangement shown in FIGS. 3 and 4, projects from the inner surface of sidewalls 11 of body 15'.

Door 20' differs from door 20 in that it is provided with or formed with suitable compartments for a rechargeable battery and a transformer, and/or for storage of extra food chambers 35 and various picnic items. These compartments are formed by extending the sidewalls of casing 24' outwardly beyond a transverse partition 44 forming the surface engaged by resilient strips 28 bearing against insulated body 23. The extended sidewalls are indicated at 46. A partition or shelf 47 extends between a pair of opposite extended sidewalls 46 to divide the aforementioned compartment in door 20' to provide an upper storage space 48 arranged to receive extra food chambers 35 as well as food and picnic items indicated generally at 49. Such items may include, for example, salt, pepper and various condiments. Shelf 47 also forms a lower compartment which receives a multi-cell rechargeable battery 45 and a transformer 50. A door 51 is hinged at 52 to a sidewall extension 46 to close the compartment formed in door 20'.

A utility cord 53 is connected to the input side of transformer 50 at a wiring junction 54. Cord 53 has a cord plug 56 at its outer end whereby the cord may be plugged into any suitable convenience outlet.

Referring to FIG. 5, a diode or rectifier 57 is connected in series between one secondary terminal of transformer 50 and a contact of a control switch indicated at 55 and having a movable arm 58. Switch arm 58 is connected to one terminal of battery 45 and the opposite terminal of battery 45 is connected to the other terminal of the secondary of transformer 50. Switch 55 is a single pole, double throw switch, and another fixed contact thereof is connected to one side of a female connector 60 which is mounted in a recess in the inner surface of insulating body 23 of door 20' so as to engage male connector 43 when door 20' is closed with relation to body 15'. The other side of female connector 60 is electrically connected to that terminal of battery 45 which is connected directly to the secondary of transformer 50. Pilot light 38 is connected across female connector 60. In the position of switch 55 shown in FIG. 5, battery 45 is connected in series with heating element 40 and thermostat 34, and pilot lamp 38 will be lit. When switch 55 is thrown to its other position, and with cord plug 56 plugged into a convenience outlet, battery 45 will be recharged through diode 57.

As stated, the oven 10' of FIGS. 3, 4 and 5 is fully portable and may be used where no commercial electricity is available, by heating element 40 from battery 45. Battery 45 may be conveniently recharged at any time by moving switch 55 from the position shown on the drawing to its other position.

The type of compartmented door 20' of FIGS. 3 and 4 may also be substituted for door 20 of oven 10 of FIG. 1. In such case, the compartments are used solely for storage of food and picnic items, as no battery is used with oven 10 and no transformer is necessary.

Referring to FIGS. 6 and 7, a preferred form of electric resistance element 40' is illustrated as secured to grill 25. Element 40', as best seen in FIG. 7, comprises a pair of copper conductors 62 enclosed, in laterally spaced relation, between impregnated asbestos strips 63. A layer of graphite 64 is also enclosed between strips 63 and in electrical contact with conductors 62. At one end of element 40', as viewed in FIG. 6, conductors 62 extend beyond strips 63 for connection to connector 32 or 43.

While specific embodiments of the invention have been shown and described in detail to illustrate the application of the principles of the invention, it will be understood that the invention may be embodied otherwise without departing from such principles.

What is claimed is:

1. In a solar oven comprising a body including an insulated heating compartment and means for concentrating solar energy into said compartment to elevate the temperature thereof; the improvement comprising an electric heating element disposed within said insulated heating compartment, an externally accessible electrical connector, for connection to a source of electric potential, and conductors connecting said heating element to said connector.

2. In a solar oven comprising a body including an insulated heating compartment, and means for concentrating solar energy into said compartment to elevate the temperature thereof; the improvement comprising an electric heating element disposed within said heating compartment, an externally accessible electrical connector, for connection to a source of electric potential, conductors connecting said heating element to said connector, and a switch controlling connection of said heating element to said connector.

3. In a solar oven comprising a body including an insulated heating compartment having one wall constituted by a substantially flat metal plate of heat conducting and heat absorbing metal, and means for concentrating solar energy onto said plate to elevate the temperature of said insulated heating compartment; the improvement comprising an electric resistance heating element extending along the inner surface of said plate within said insulated heating compartment, an externally accessible electrical connector, for connection to a source of electric potential, and conductors connecting said heating element to said connector.

4. In a solar oven, the improvement claimed in claim 3, including an adhesive tape of heat insulating material covering said resistance heating element and securing the same to said surface of said plate.

5. In a solar oven comprising a body including an insulated heating compartment and a means for concentrating solar energy into said compartment to elevate the temperature thereof; the improvement comprising an electric heating element disposed within said insulated heating compartment, an externally accessible first electrical connector on said body, for connection to a source of electric potential, conductors connecting said heating element to said connector, an insulated door hinged to said body and defining a wall of said insulated compartment, a second electrical connector on said door engageable with said first connector on closure of said door, a rechargeable battery mounted in said door, a utility cord and plug extending from said door, and switch means on said door electrically operable to connect said battery to said second electrical connector, for energizing said element, or to said cord, for recharging said battery.

6. In a solar oven, the improvement claimed in claim 5, in which the outer surface of the said door is formed as a compartment to receive said rechargeable battery, such compartment being subdivided to provide a storage space for food, food chambers and picnic items, and a cover hinged to said door to close said compartment therein.

7. In a solar oven, the improvement claimed in claim 6, including a transformer in said door compartment, and having its primary winding connected to said utility cord and its secondary winding connected to a rectifier means, said switch means having one position connecting said battery to the secondary winding of said transformer through said rectifier means and a second position connecting said battery to said second electrical connector.

8. In a solar oven, the improvement claimed in claim 3 in which said heating element comprises a pair of laterally spaced conductors enclosed between strips of heat resistant dielectric material and electrically interconnected by a layer of graphite between said strips and in contact with said conductors.

9. In a solar oven, the improvement claimed in claim 3 including a door closing said heating compartment; the outer surface of said door being as a storage compartment, and a cover for said compartment.

References Cited by the Examiner

UNITED STATES PATENTS

| | | | |
|---|---|---|---|
| 412,725 | 10/1889 | Calver | 126—271 |
| 681,095 | 8/1901 | Baker | 126—270 |
| 1,074,219 | 9/1913 | Skiff | 126—270 |
| 3,025,851 | 3/1962 | Steinberg | 126—270 |
| 3,106,201 | 10/1963 | Steinberg | 126—270 |

FREDERICK L. MATTESON, JR., *Primary Examiner.*

JAMES W. WESTHAVER, *Examiner.*